April 28, 1970   L. A. KAMENTSKY   3,508,655
CELL EXTRACTION AND COLLECTION APPARATUS
Filed Feb. 3, 1967   3 Sheets-Sheet 1

INVENTOR
LOUIS A. KAMENTSKY

BY *John E. Daugherty Jr.*

ATTORNEY

United States Patent Office 3,508,655
Patented Apr. 28, 1970

3,508,655
CELL EXTRACTION AND COLLECTION APPARATUS
Louis A. Kamentsky, Briarcliff Manor, N.Y., assignor to International Business Machines Corporation, Armonk, N.Y., a corporation of New York
Filed Feb. 3, 1967, Ser. No. 613,786
Int. Cl. B01d 43/00
U.S. Cl. 210—85          12 Claims

ABSTRACT OF THE DISCLOSURE

The apparatus for collecting cells or other particles, which have been separated by a cell separator, is connected to an extraction channel which extends from a main channel along which the cells, suspended in fluid, are passed. Prior to reaching a separating station at which the extraction channel is connected, the cells are analyzed for predetermined characteristics and cells identified as having these characteristics are diverted from the main channel into the extraction channel. This is accomplished by a piston in the extraction channel which is withdrawn in step-by-step fashion under control of the cell analyzer to divert the identified cells into the extraction channel. The extraction channel is provided with an opening to which a cell collecting device is connected. This opening is located in a portion of the extraction channel which is removed from that portion of the channel into which the cells are diverted during the separating operation. The piston covers this opening during this operation and, upon completion of the operation, the piston is withdrawn to uncover the opening to the collecting device and fluid is forced through the main channel and the extraction channel to both purge the system and cause the separated cells to be collected on a millipore filter in the collection device.

BACKGROUND OF THE INVENTION

Field of the invention

This invention relates to a particle separating and collecting structure. More specifically, the invention relates to a structure which may be used for analyzing, separating and collecting human cells. The cells are analyzed for characteristics which may, for example, indicate cancer, and cells identified as having these characteristics are separated into an extraction channel. Thereafter the separated cells are collected in an operation during which the entire system is purged to prepare the system for another separating operation.

Description of the prior art

Background prior art is found in copending application Ser. No. 451,947 filed Apr. 29, 1965, now Patent No. 3,413,464, issued Nov. 26, 1968, by L. A. Kamentsky and commonly assigned which shows a cell separator of the type with which the present invention may be used. More specific prior art is found in copending application Ser. No. 508,307 of L. A. Kamentsky, filed Nov. 17, 1965, which is directed to a particle separator, and to application Ser. No. 613,214 filed Feb. 1, 1965 filed in behalf of H. Glaettli, and commonly assigned, which is directed to a cell separator structure which can easily be combined with the cell collecting structure to which the subject application is directed.

SUMMARY OF THE INVENTION

This invention is directed to that portion of a cell separating apparatus which is employed, after the cells are separated into an extraction channel, to collect those cells for further examination. In the cell separating apparatus which is the subject of the above-identified application Ser. No. 613,214, the cells are passed along a main channel in which they are analyzed before reaching a separating station. An extraction channel extends from the main channel at the separating station. Under control of the analyzing apparatus, a piston located in the extracting channel is operated to cause each identified cell to be withdrawn at the separating station into the extraction channel. In the apparatus of this copending application it is necessary, after all of the cells for a given sample have been extracted, to remove the entire extraction structure to collect these cells. In accordance with the principles of the present invention an improved structure is provided for collecting the extracted cells on a millipore filter in a single operation during which the cells are not only collected, but the system is purged in anticipation of testing the cells for another sample. This is accomplished by providing in the extracting channel, at a position which is removed from that portion of the channel in which the cells are placed during the separating and extracting operations, an opening which is connected to a collection device which includes the millipore filter. After completion of the separating and extracting operation, the piston is withdrawn to uncover this opening and fluid is flushed through the system to not only clean the system, but force the extracted cells through the opening to the collecting device where they are segregated on the filter. The opening to the collecting device, since it is isolated from the separating station by the piston during the separating operation, adds no compliance to the system which might disturb the fluid dynamic relationships necessary for most efficient operation of the cell separator. At the same time the cells, once separated and extracted, are collected in a form in which they can be readily processed for further examination without the need for dismantling any significant portion of the over-all system. During this same operation which causes the cells to be collected, the system is purged to ready it for a subsequent cell analyzing and separating operation.

Therefore it is an object of the present invention to provide a simple cell collecting apparatus which can be used in a system which analyzes and separates extremely small particles such as human cells.

It is another object of the present invention to provide a totally integrated cell separating, extracting and collecting mechanism, which allows for easy collection of the extracted cells without the necessity for dismantling any significant portion of the over-all structure.

It is still another object of the invention to provide a cell collecting apparatus for a cell separating device, in which the cells are collected during a single operation that, at the same time, purges the system to prepare it for a subsequent separating and extraction operation.

The foregoing and other objects, features and advantages of the invention will be apparent from the following more particular description of preferred embodiments of the invention, as illustrated in the accompanying drawings.

DESCRIPTION OF PREFERRED EMBODIMENTS

Figure 1:
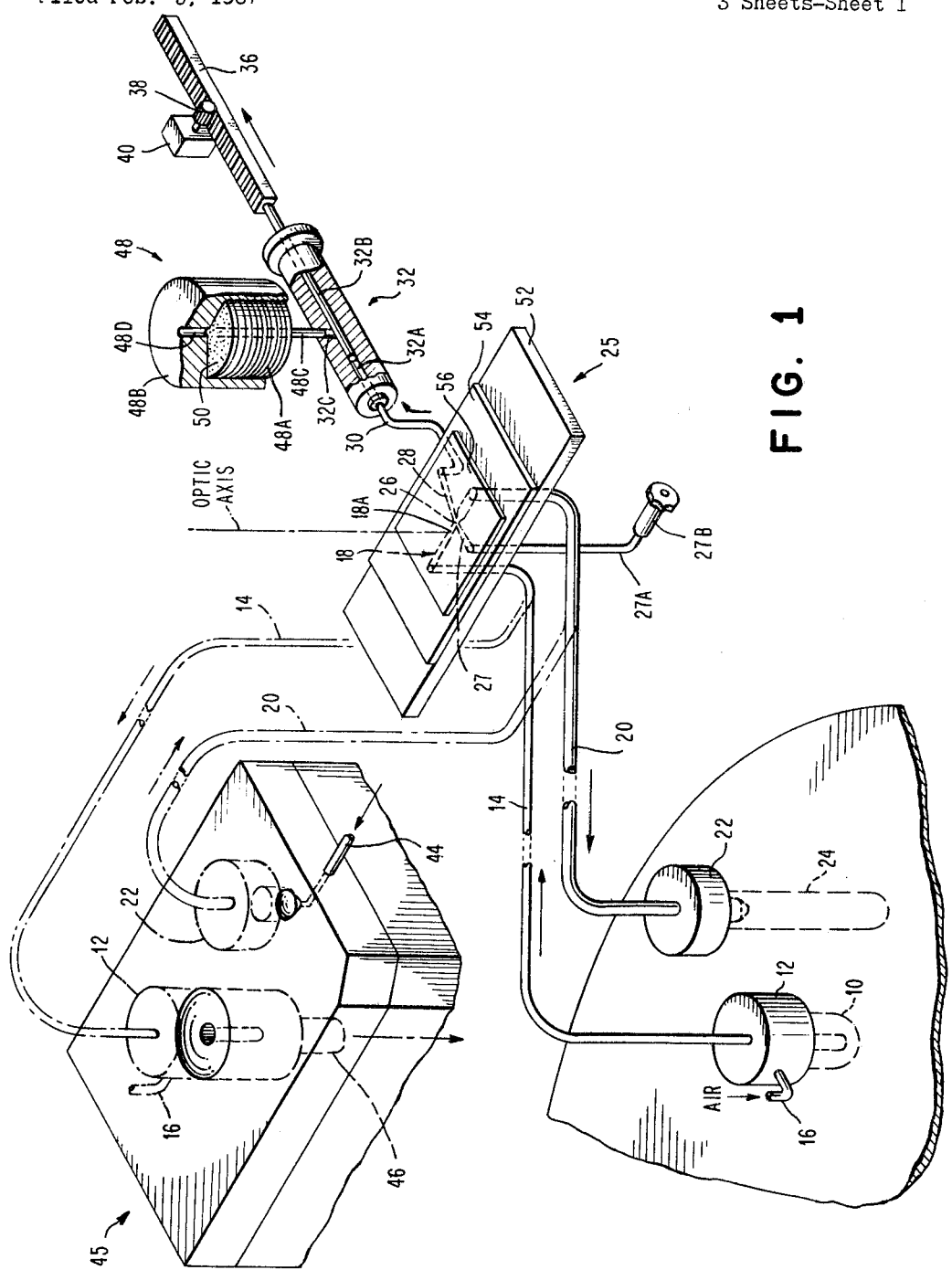
FIG. 1 is a perspective view in somewhat schematic form, of the principal parts of one embodiment of the cell separating and collecting device.

The perspective view of FIG. 1 illustrates the arrangement of the principal parts of the apparatus and the manner in which these parts are connected to separate cells according to the predetermined characteristics and, thereafter, to collect the separated cells for further examination. The cells to be analyzed are placed in a liquid solution in a container 10. This container is provided with a head 12 through which there extends a piece of flexible tubing 14. A further tube 16 extends through head 12 into container 10 and air is forced through tube 16 to force the liquid solution containing the cells to be fed up from the container into tube 14. Tube 14 is connected to one end of a main channel 18 of the cell separating apparatus. The other end of main channel 18 is connected to another tube 20 which is, in turn, connected to a head 22 on an outlet container 24.

Thus, the normal path for the liquid carrying the cells from container 10, under the force of the air pressure applied at 16, is through tube 14 to one end of the main channel 18, through this channel and out through the other end of the channel into tube 20 to container 24. This is the path for all of the cells which, upon examination by the analyzer system, are found not to have the characteristics for which the cells are being examined. The analysis of the cells takes place at an analyzing or inspection station located in channel 18 at point 18A. Analyzing light is applied through the channel 18 along an optic axis which intercepts this channel at station 18A. The method of analysis is discussed below with specific reference to FIG. 2.

For the purposes of the present discussion, it is sufficient to state that those cells, which are found to have predetermined characteristics, are diverted from channel 18 at a separating station 26 into an extraction channel 28. Another channel 27 extends away from the main channel 18 at separating station 26. Channel 27 is connected by a tube 27A to a valve 27B which is operated to place an air bubble in this channel which helps reduce cavitation effects at separating station 26. The extraction channel includes a fixed portion 28 in the block, generally designated 25, and a flexible portion in the form of a tube 30 which connects the channel to a syringe-like mechanism generally designated 32. The final portion of the extraction channel is within a syringe 32 and is designated 32A. A piston 32B is mounted in channel 32A and this piston is attached to a rack 36 operated by a pinion gear 38 which is, in turn, connected to a stepping motor 40.

Stepping motor 40 is controlled by the analyzing and detection mechanism at inspection station 18A. When a cell is recognized to have predetermined characteristics, stepping motor 40 is operated to move rack 36 and attached piston 32B one step to the right and thereby cause the identified cell to be withdrawn into the extraction channel 28. When piston 32B is moved to the right, a hydraulic pulse is propagated along the extraction channel to the separating station 26. This pulse causes fluid to flow from channel 27 into the fixed portion 28 of the extraction channel. The timing of the operation of stepping motor 40 must be controlled so that this pulse reaches station 26A at the same time as the cell previously identified at station 18A.

It can be seen from the above that when cells from container 10 are fed through the cell separating apparatus and analyzed, those cells which are not identified as having predetermined characteristics pass along the main channel 18 and back to the outlet container 24. Each cell, which is identified as having the proper characteristics, is diverted into the extraction channel 28 under the control of piston 32B which is moved in step-by-step fashion by stepping motor 40 under control of the analyzing and detecting system. Piston 32B within the syringe 32 is maintained, during this cell separating operation, to the left of a radial opening 32C provided within the extraction channel 32A of syringe 32. Piston 32B covers this opening 32C during the separating operation, and all of the cells which are extracted remain in that portion of the extraction channel formed between the front face of piston 32B and the separating station 26.

After the entire sample in container 10 has been analyzed and the identified cells separated and extracted in this manner, the two flexible tubes 14 and 20 are moved to the positions indicated in phantom in FIG. 1. In these positions the tubes are connected to a washing station 45 at which tube 20, in head 22, is connected to a water inlet 44 and tube 14, in head 12, is connected to a drain 46. With the tubes 14 and 20 in this position at the wash station, water is forced from inlet 44 through tube 20 in a reverse direction back through the main channel 18 of the cell separator and then via tube 14 to the drain 46. By this operation the main channel is purged for the next sample. During this purging operation, after the tubes are completely filled with fluid, motor 40 is activated to move rack 36 to the right. Piston 32B is then moved a sufficient distance to expose opening 32C. Fluid, being fed at this time in the reverse direction through main channel 18, is diverted to force the cells collected in the extraction channel back through this channel and up through the opening 32C into a cell collecting device generally designated 48.

Cell collecting device 48 is formed of a threaded cylinder 48A on which a cap 48B is removably mounted. A tube 48C extends from opening 32C through cylinder 48A. On top of this cylinder a millipore filter 50 is mounted. A further tube 48D extends from above filter 50 through the cap 48B. The filter 50 is sufficiently porous that the fluid, in which the cells are suspended, is passed directly through the filter and exits from the system through tube 48D. The extracted cells are, however, collected on filter 50 and upon completion of the purging and collecting operation, the cap 48B can be unscrewed and the filter 50 removed and placed on an appropriate slide to allow for further examination of the collected cells.

It should be noted that during the above-described collecting operation, when tubes 14 and 20 are moved to the washing station, not only are the extracted cells forced into the cell collector 48 and collected on filter 50, but this entire section of the apparatus is cleansed by the very fluid which is employed to produce the cell collection. It should also be noted that the opening 32C is behind the portion of the extraction channel in which the cells are extracted during the collection operation, and does not add any compliance to the cell separating system. This is an important characteristic of the apparatus since the separating operation is a very critical one and requires close control not only of the geometry of the separator, but also of the fluid dynamic characteristics of the entire system. The cells being analyzed typically have dimensions in the order of one thousandth of an inch. The channels are only slightly larger so that the cells are fed one at a time through the system.

In FIG. 1, the actual separating station in the main channel 18 is shown to be formed in block 25 which includes three separate plates designated 52, 54 and 56. Plate 52 is a glass plate on which plate 54 is affixed. Plate 54 is a metal plate and the pattern for the cell separator including the main channel 18, the extraction channel 28 and the anti-cavitation channel 27 is formed in this plate. The channels are closed by affixing to the top of element 54 a very thin plate 56 which, like glass plate 52, is transparent to the optical rays employed at the analyzer station 18 to analyze the cells.

Figure 3:
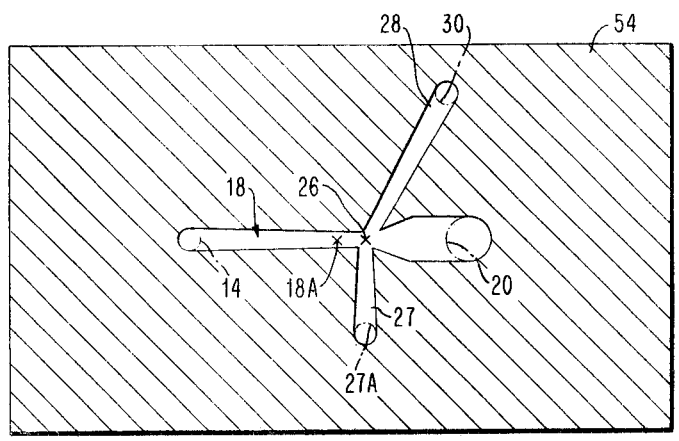
FIG. 3 is an enlarged plan view of one of the plates which form the block in which the cell separator channels are located.

The geometry of the cell separating apparatus is the same as that shown and claimed in a copending application Ser. No. 613,214 filed in the name of Hans Glaettli, and commonly assigned. FIG. 3 is a somewhat enlarged showing of the plate 54 in which the geometry of the cell separating structure is formed. In this figure, the positions of the analyzing station 18A and the cell separating station 26 are indicated by appropriately designated X's.

Figure 2:
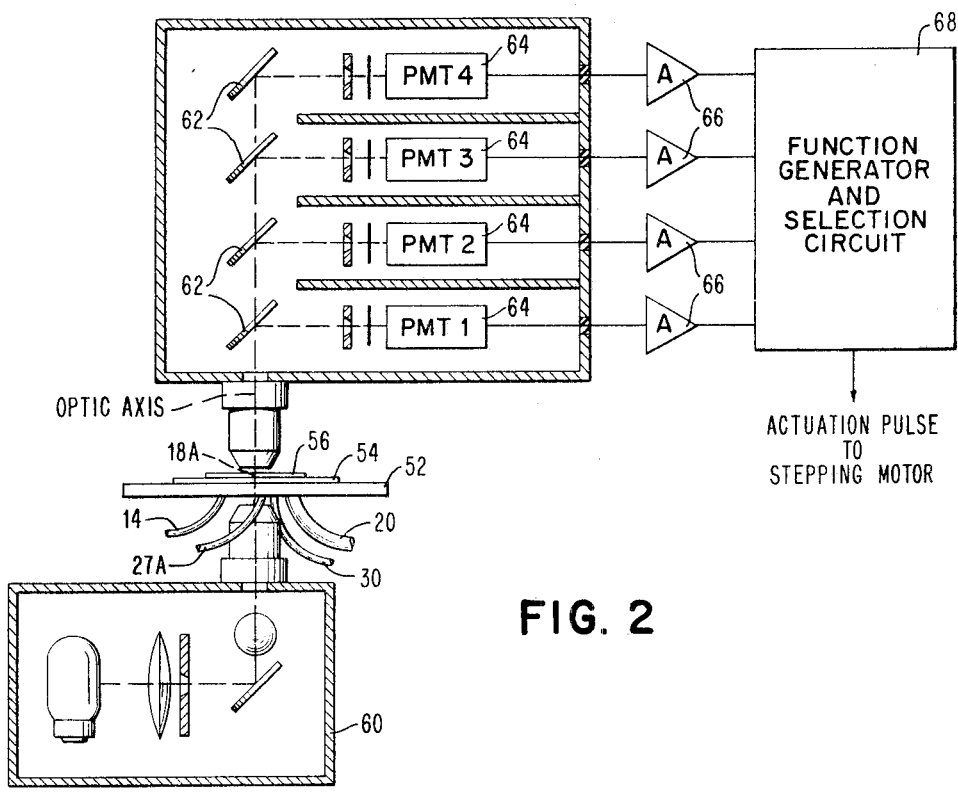
FIG. 2 is a drawing, partly in block diagram form, which illustrates the relationship between the cell separator and the optic and electronic analyzing devices for the embodiment of FIG. 1.

In FIG. 2 the cell separating portion of the structure of FIG. 1 is shown in relationship to the optical and electronic circuits which are employed to analyze the cells. In this figure the three plates 52, 54 and 56, which form the various channels, and the tubular connections 14, 20, 27A and 30, to these channels are illustrated. A source of light is represented by a block 60, and this source applies light which is reflected up through the main channel 18 at analyzer station 18A to intercept the cells as they are being fed along this main channel. The light from source 60, after absorption and scattering by the cell to be analyzed, is applied to a series of four dichchroic mirrors 62. Each of these mirrors is designed to reflect light at certain frequencies and to transmit light at other frequencies. The reflected light is applied as an input to an associated one of a group of four photomultiplier tubes 64 to produce an electrical output which is amplified by an appropriate amplifier 66. The outputs of these amplifiers are applied to a function generator and selection circuit 68. Circuit 68 is designed to respond to predetermined combinations of inputs from the amplifiers 66 to provide an activation pulse to the stepping motor 40 of FIG. 1. Such a pulse indicates that a cell passing the analyzer station 18A has certain predetermined characteristics and this cell is diverted into channel 28. The characteristics tested may vary according to the purposes for which the cell analysis is being conducted. For details of one system of cell analysis which is useful in identifying cancer cells, reference may be had to the above-cited copending application Ser. No. 451,947, now Patent No. 3,413,464.

Figure 4:
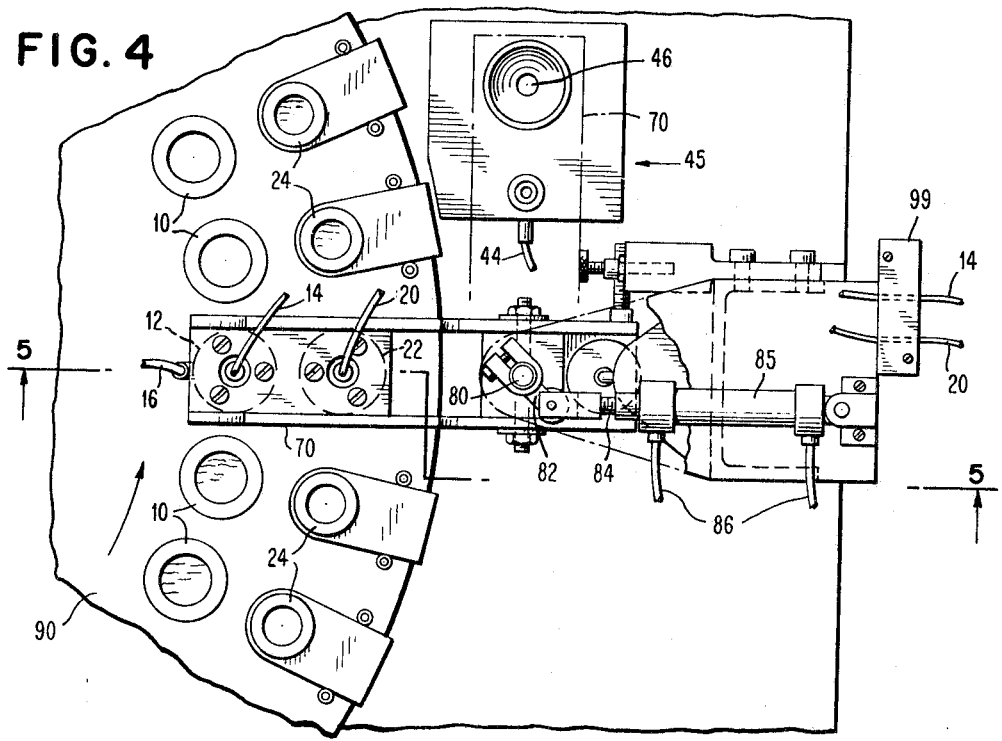
FIGS. 4 and 5 are, respectively, a plan view and a sectional side view, which show in detail the structure employed to connect the cell separator to the sample and outlet containers during a cell separating operation and to the washing station during a purging and cell collecting operation.
Figure 5:
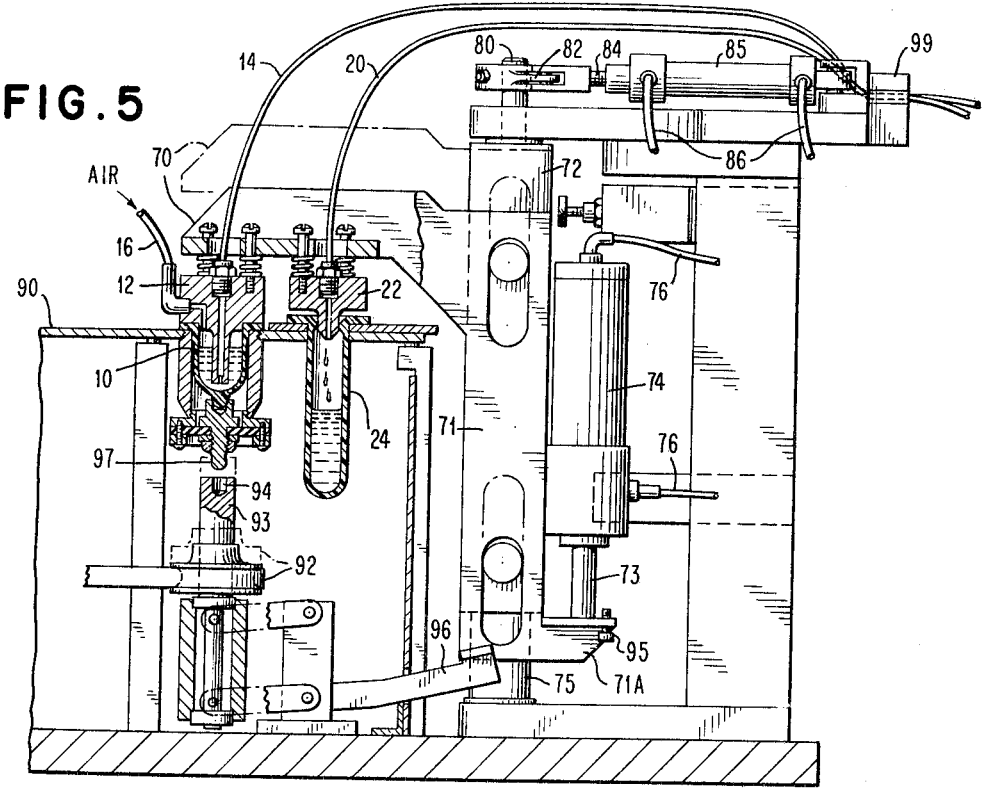

FIGS. 4 and 5 are, respectively, plan and sectional side views which reveal, in more detail, the structure of the head assemblies 12 and 22 and the manner in which these assemblies are positioned during the various cycles of operation described above. Heads 12 and 22, as is shown in these figures, are mounted on an arm 70. This arm is an integral part of a slide 71 mounted on a block 72. Block 72 is, in turn, mounted on a rod 75 on which it may be rotated. Slide 71 has an extension 71A which is connected to a piston 73 of an air cylinder 74. Air is applied through a pair of tubes 76 for cylinder 74 to position the piston 73 in either an upward or a downward position. When in its downward position, as shown in FIG. 5, the slide 71 and the arm 70 position heads 12 and 22, respectively, on the sample container 10 and the outlet container 24. After a cycle during which the cells suspended in a liquid container 10 are fed through tube 14 for analysis and separation, air is fed through tubes 76 to cylinder 74 to raise the slide 71 and arm 70 to the upward position, indicated in phantom, in FIG. 5.

A rod 80 is connected to block 72 and this rod is connected to a lever 82 which, in turn, is connected to a piston 84 of a second air cylinder 85. Air is fed through a pair of tubes 86 to cylinder 85 to move piston 84 to the left, as viewed in FIG. 4, thereby rotating lever 82 in a clockwise direction. Rod 80 and block 72, which is attached to the rod, are rotated in the same direction to carry the then raised arm 70 to a position over the wash station 45. The two heads 12 and 22, which are carried on arm 70, are then lowered by applying through tubes 76 to cylinder 74 air in a direction to lower slide 71 on block 72.

The purging operation, described above, during which the extracted cells are collected on the millipore filter, is then carried out by forcing water into the inlet 44 and out through the tube 20 which is then positioned at the wash station 45. Upon completion of the purging operation, during which the cells are collected, air cylinders 74 and 85 are again operated to return the two heads 12 and 22 to their original position.

As is shown in FIG. 4, a series of sample containers 10 and associated outlet containers 24, for receiving these samples after a separating operation, are mounted on a turntable 90. This turntable is rotated during the above-described purging and cell collecting cycle so that, when heads 12 and 22, carried by arm 70, are returned to the condition shown in FIGS. 4 and 5, a new sample in a container 10 is available for analysis and separation.

During the time that the purging and collecting operation is taking place, the solution carrying the cells in the next sample to be analyzed is thoroughly mixed. This is accomplished by a structure shown in FIG. 5, which includes a pulley 92, which drives a rod 93 having an opening 94 at its upper end. When the arm 70 on block 72 is rotated to the washing station 45, a screw 95 mounted on slide 71 contacts an arm 96 which is coupled to the rod 93. This structure is then raised to cause opening 94 to engage one end of a pin 97, the other end of which engages container 10. Opening 94 is eccentrically arranged with respect to pin 97. When this opening engages the pin, an oscillating action is produced at the container 10 to provide a vortex like movement of the fluid in which the cells are suspended in that container. In this manner the cells are thoroughly mixed in the fluid just prior to the cell analyzing and separating operation.

As shown in FIGS. 4 and 5, the two tubes 14 and 20 are passed through a block 99. This block includes a photocell that is controlled to determine when fluid is being passed through these tubes. This photocell provides a signal which indicates when all of the sample in a container 10 has been fed into the cell separator for analysis and separation. The signal is transmitted to a synchronous timer, not shown, which controls the operations described above to move the arm 70 carrying heads 12 and 22 to the wash station 45.

The embodiment of the cell collecting device 48, shown in FIG. 1, is designed to carry only a single millipore filter. This device requires that the cap 48B be removed after each collecting operation and that the filter with the collected cells be removed and replaced with a new filter. It will, of course, be obvious to those skilled in the art that a continuous filter may be employed in which the filter is advanced between successive operations on different samples. In such a structure it is necessary, of course, to keep a close correlation between the sections of the filter carrying the extracted cells and the samples on the turntable from which those cells were obtained.

While the invention has been particularly shown and described with reference to preferred embodiments thereof, it will be understood by those skilled in the art that various changes in form and details may be made therein without departing from the spirit and scope of the invention.

What is claimed is:

1. In a particle separating and collecting apparatus of the type in which particles are passed through a main channel, which includes an analyzing station at which analyzing means identify particles having certain properties, and a separating station at which identified particles are diverted into an extraction channel; and said extraction channel includes a piston and means for moving said piston away from said separating station under control of said analyzing means during a separating operation to divert particles identified to have said certain properties into said extraction channel; the improvement comprising:
   (a) an opening in said extraction channel;
   (b) collecting means connected to said opening for collecting cells which are extracted into said extraction channel during a separating operation;
   (c) said piston being located between said separating station and said opening in the extraction channel during a separating operation; and (d) said means for moving said piston including means for withdrawing said piston to uncover said opening after a separating operation to allow the separated particles in the extraction channel to be passed through said opening and collected by said collecting means.

2. The apparatus of claim 1 wherein said apparatus includes means for flushing fluid through said main channel during a collecting operation following a separating operation;

said fluid being diverted into said extraction channel when said piston is withdrawn to expose said opening in the extraction channel to force said extracted particles through said opening in said collecting means.

3. The apparatus of claim 2 wherein said collecting means includes a particle collector which collects said separated cells but which is sufficiently porous to allow said fluid to pass therethrough during a collecting operation.

4. The apparatus of claim 2 wherein said fluid is flushed through said main channel during a collecting operation in a direction opposite to the direction in which the particles are passed during a separating operation.

5. The apparatus of claim 2 wherein during a collecting operation said fluid is first passed through said main channel to fill said main channel and thereafter through said extraction channel when said piston is withdrawn past said opening to both purge said extraction channel and force the separated particles through said opening to said collection means.

6. The apparatus of claim 1 wherein said extraction channel comprises a cylindrical channel in which said plunger is slidably mounted and said opening is a radial opening in the side of said cylindrical channel which is covered by said piston during a separating operation.

7. In a cell separating and collecting apparatus of the type in which cells are analyzed for certain characteristics and those identified as having these characteristics are separated from the main body of cells, said cells being suspended in a fluid and passed through a main channel to which there is connected at a separating station an extraction channel into which the identified cells are diverted, said extraction channel including a piston mounted in the channel which piston is moved in the extraction channel away from the separating station to cause identified cells to be diverted into a portion of the extraction channel between the separating station and the piston; the improvement comprising:

(a) an opening in the side of said extraction channel at a position in said extraction channel removed from the portion of the extraction channel into which said cells are diverted and said opening being separated from that portion of the extraction channel by said piston when said identified cells are being extracted;

(b) means operable after one or more cells are diverted into said portion of said extraction channel to withdraw said piston away from said separating station a distance sufficient to allow said one or more cells to be passed to and through said opening; and (c) means connected to said opening for collecting said cells.

8. The apparatus of claim 7 further including:

means for forcing fluid through said main channel and said extraction channel after said one or more cells are diverted into said extraction channel to both cleanse said channels and force said one or more cells through said opening in said extraction channel to said collection means.

9. The apparatus of claim 8 wherein said collection means includes a filter element sufficiently porous to allow the fluid to pass therethrough but effective to collect the cells carried by said fluid.

10. The apparatus of claim 7 wherein said apparatus includes a first tube having one end thereof connected to one end of said main channel;

a second tube having one end thereof connected to the other end of said main channel; and means operable to couple the other end of said first tube to a container carrying the cells to be analyzed and the other end of said second tube to an outlet container for cells which pass said separating station during a cell separating operation;

said last named means being operable to couple the other end of said second tube to a source of fluid and the other end of said first tube to a fluid outlet during a cell collection operation following a cell separating operation.

11. An extraction and collection apparatus for a cell separator of the type which includes a main channel through which cells are passed and to which the extracting and collecting apparatus is connected for receiving cells which are identified as having certain characteristics, said extraction and collection apparatus comprising:

(a) an extraction channel connected to said main channel at a separating station in said main channel;

(b) a piston mounted in said extraction channel and moveable in a direction away from said separating channel to extract cells into a first portion of the extraction channel between the piston and the separating station;

(c) an opening in a portion of said extraction channel removed from said first portion and separated from said first portion by said piston when said cells are being extracted;

(d) means for withdrawing said piston in said extraction channel past said opening after said cells are extracted from said main channel into said first portion of said extraction channel; and (e) collection means including a cell collector connected to said opening.

12. The apparatus of claim 11 including means for forcing fluid through said main channel and said extraction channel after said cells are extracted into said first portion of said extraction channel to both cleanse said channels and force said cells through said opening to said cell collection means when said piston is withdrawn past said opening.

References Cited

UNITED STATES PATENTS

| | | | |
|---|---|---|---|
| 2,905,169 | 9/1959 | Nieburgs | 128—2 |
| 2,961,302 | 11/1960 | Sanz | 23—259 |
| 3,215,900 | 11/1965 | Harvey | 137—93 X |
| 3,335,724 | 8/1967 | Glenapp | 128—218 |

REUBEN FRIEDMAN, Primary Examiner

T. A. GRANGER, Assistant Examiner